United States Patent
Kase

[11] Patent Number: 5,991,703
[45] Date of Patent: Nov. 23, 1999

[54] METHOD OF SYNTHESIZING MEASUREMENT DATA OF FREE-FORM SURFACE

[75] Inventor: Kiwamu Kase, Wako, Japan

[73] Assignee: The Institute of Physical and Chemical Research, Wako, Japan

[21] Appl. No.: 09/134,913

[22] Filed: Aug. 17, 1998

[30] Foreign Application Priority Data

Aug. 15, 1997 [JP] Japan .................................. 9-220259

[51] Int. Cl.$^6$ .................................................. G06F 15/00
[52] U.S. Cl. ...................... 702/167; 345/441; 364/474.29
[58] Field of Search ............................ 702/167; 345/420, 345/429, 441; 364/474.24, 474.29, 512; 356/376

[56] References Cited

U.S. PATENT DOCUMENTS

| | | | |
|---|---|---|---|
| 4,953,094 | 8/1990 | Letcher, Jr. ........................ | 364/474.24 |
| 5,119,309 | 6/1992 | Cavendish et al. ................ | 364/474.24 |
| 5,265,197 | 11/1993 | Kondo ..................................... | 345/420 |
| 5,627,949 | 5/1997 | Letcher, Jr. ........................ | 364/474.24 |
| 5,856,828 | 1/1999 | Letcher, Jr. ............................. | 345/420 |

OTHER PUBLICATIONS

Gerald Farin, Curves and Surfaces for Computer Aided Geometric Design, A Practical Guide, 1998 by Academic Press, Inc., pp. 275–291.

*Primary Examiner*—John E. Barlow, Jr.
*Assistant Examiner*—Bryan Bui
*Attorney, Agent, or Firm*—Griffin, Butler, Whisenhunt & Szipl, LLP

[57] ABSTRACT

(a) A surface shape of an object 1 is measured from different positions and/or different directions and plural partial measurement data 2 including common part 1a is obtained. (b) A parametric surface showing the surface shape of each measurement range is formed from the data. (c) A plurality of sampling points are set at a predetermined pitch in the common part and the Gaussian curvature K and/or an average curvature H are calculated from the principal curvatures ($\kappa_1$, $\kappa_2$) in the points. (d) Three or more characteristic points are selected in accordance with the order from larger absolute values of K or H in the common part and a normal vector of a plane constructed by three points among the points is calculated. (e) The common parts are made coincide with each other by moving the parametric surfaces so as to coincide the three characteristic points with each other and to coincide the directions of the normal vectors with each other. Consequently, the synthesis data can be formed from the partial measurement data obtained from the free-form surface.

4 Claims, 3 Drawing Sheets

METHOD OF SYNTHESIZING MEASUREMENT DATA OF FREE-FORM SURFACE

BACKGROUND OF THE INVENTION

1. Technical Field of the Invention

The present invention relates to a method of synthesizing shape data by patching partial surface shape data of a free-form surface.

2. Description of the Related Art

When the surface shape of a wide object which cannot be measured by one operation or a complicated solid three-dimensional object which can be measured only from different directions such as a case where shape data of the surface of a mock-up of a vehicle is measured, it is necessary to measure the surface parts of the object from different positions or directions by using a three coordinate measuring machine (digitizer) and to synthesize (patch) partial measurement data obtained.

As methods of synthesizing the partial measurement data, the following methods are conventionally known.

(1) Plural partial measurement data is displayed on a CRT and the operator moves the data while seeing the image so as to coincide overlapped parts with each other (manual method).

(2) Rotation and translation distances of a measuring machine are preliminarily measured and the measurement values are inversely transformed (mechanical measurement method).

(3) Markers such as white or light spots are made by ink or the like and positioning is performed (marker method).

(4) In case of a simple shape such as Z=f(x, y), undetermined multipliers of its analytic surface are fit by an optimization method such as least-squares method (analytic fitting method).

These conventional methods of synthesizing the partial measurement data have, however, the following problems.

According to the manual method (1), the skill of the operator is required and only synthesis with low accuracy can be performed. According to the mechanical measurement method (2), since it is necessary to mechanically rotate or translate the measuring machine, the size of the measuring machine is increased and the machine is complicated. Since an influence of a backlash or the like of the machine is incurred, the method is limited by the mechanical accuracy. According to the marker method (3), since markers are indispensable, the method cannot be applied to an object to which markers cannot be made. An error can also occur by making the markers. The analytic fitting method (4) has the feature that the accuracy which is higher than the mechanical accuracy and is almost equal to the measurement data can be obtained. An object is, however, limited to a simple shape (analytic shape Z=f(x, y)).

SUMMARY OF THE INVENTION

The present invention is made in order to solve the problems. That is, an object of the invention is to provide a method of synthesizing measurement data of a free-form surface, which can form synthesis data with accuracy as high as that of measurement data from partial measurement data obtained from a free-form surface which is not limited to a simple shape without being limited to mechanical accuracy, without using markers, and without requiring the skill.

The inventors of the present invention directed their attentions to a fact such that characteristic points (for example, maximal points) can be used instead of markers by classifying the local shapes of the free-form surface into three types (mountain, valley, and peak) by using the "principal curvature" as an evaluation model which does not depend on the coordinate system. The invention is based on the novel ideas.

According to the invention, there is provided a method of synthesizing measurement data of a free-form surface, comprising the steps of: (a) measuring a surface shape of an object from different positions and directions and obtaining plural partial measurement data including a common part; (b) forming a parametric surface showing the surface shape of each measurement range from the plural partial measurement data; (c) setting a plurality of sampling points at a predetermined pitch in the common part on each parametric surface and calculating the Gaussian curvature $K=\kappa_1 \times \kappa_2$ and an average curvature $H=(\kappa_1+\kappa_2)/2$ from the principal curvature $(\kappa_1, \kappa_2)$ in the sampling points, (d) selecting three or more characteristic points in accordance with the order from larger absolute values of the Gaussian curvature K and/or the average curvature H in the common part and calculating a normal vector of a plane constructed by three points among the characteristic points; and (e) making the common parts coincide with each other by moving the parametric surfaces so as to coincide the three characteristic points with each other and the directions of the normal vectors with each other.

The Gaussian curvature K is a product $\kappa_1 \kappa_2$ of the principal curvatures $\kappa_1$ and $\kappa_2$ of a three-dimensional surface. It is known that (1) when K>0, the shape is elliptic, (2) when K=0, the shape is parabolic, and (3) when K<0, the shape is hyperbolic.

The invention uses the characteristic of the principal curvature of a free-form surface. That is, according to the method of the invention, three or more characteristic points are selected in accordance with an order from larger absolute values of the Gaussian curvature K and/or the average curvature H in a common part and the characteristic points are used instead of markers, thereby making the common parts of parametric surfaces obtained from plural partial measurement data coincide with each other and synthesizing (patching) the measurement data with high accuracy.

According to a preferable embodiment of the invention, four or more characteristic points are selected in accordance with the order from larger absolute values of the Gaussian curvature K and/or the average curvature H and normal vectors of a plurality of planes each constructed by arbitrary three points are calculated in the step (d), and the common parts are coincided with each other by moving the parametric surfaces so as to minimize the difference among a plurality of combinations of the three characteristic points and the directions of the normal vectors.

By the method, the difference between the common parts is minimized by using optimizing means such as the least-squares method using a plurality of planes each constructed by arbitrary three points and normal vectors, thereby enabling the accuracy of synthesis (patching) to be further increased.

Preferably, from the principal curvature $(\kappa_1, \kappa_2)$, (1) when $\kappa_1 \geq 0$ and $\kappa_2 \geq 0$ and $\kappa_1\kappa_2 \neq 0$, (a) it is determined that two curvatures increase. (2) When $\kappa_1 \leq 0$ and $\kappa_2 \leq 0$ and $\kappa_1\kappa_2 \neq 0$, (b) it is determined that two curvatures decrease. (3) When $\kappa_1 \cdot \kappa_2 < 0$, (c) it is determined that one of the curvatures increases and the other decreases. (a), (b), and (c) are labeled as mountain, valley, and peak, respectively, and are displayed by different symbols or colors in an image and the parametric surfaces are moved so that the labels coincide with each other.

By employing the method at the same time, the coincidence of projections and recesses of the whole common parts can be confirmed on a CRT, occurrence of an error due to an influence of noises and the like is avoided, and the reliability can be increased.

The other objects and advantageous features of the invention will be made clear from the following description with reference to the attached drawings.

DESCRIPTION OF PREFERRED EMBODIMENTS

The principle of the method of the invention will be first described.

Figure 1:
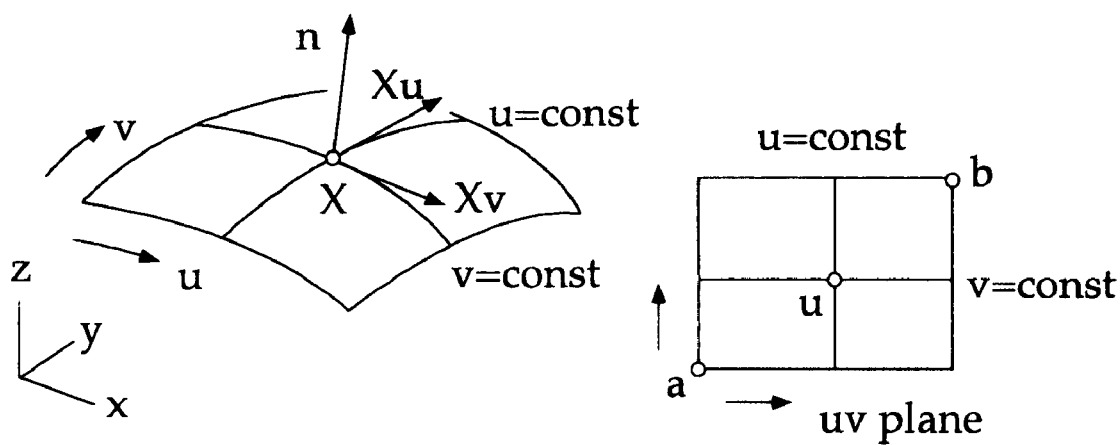
FIG. 1 is an explanatory diagram of a parametric surface.

Although a free-form surface can be expressed by an implicit function expression f(x, y, z)=0, a parameter expression shown by [Expression 1] which is more easily used is employed in the invention. A surface expressed by the parameter is called a parametric surface. FIG. 1 is an explanatory diagram of a parametric surface.

$$x = x(u, v) = \begin{bmatrix} x(u, v) \\ y(u, v) \\ z(u, v) \end{bmatrix} \left( u = \begin{bmatrix} u \\ v \end{bmatrix} \in [a, b] \subset \mathbb{R}^2 \right) \quad \text{[Expression 1]}$$

where, Cartesian coordinates (x, y, z) on the surface are a differentiable function with respect to parameters u and v and [a, b] shows a rectangle on a uv plane.

A free-form surface X=X(u, v) can be expressed by the parameters u and v. [Expression 2] is a relational expression in differential geometry. The relation is disclosed in, for example, "Curves and Surfaces for Computer Aided Geometric Design" (Farin G., 1988, A Practical Guide, Academic Press).

$$E = E(u, v) = x_u x_u \quad \text{[Expression 2]}$$

$$F = F(u, v) = x_u x_v$$

$$G = G(u, v) = x_v x_v$$

$$L = L(u, v) = -x_u n_u = nx_{uu}$$

$$M = M(u, v) = -\frac{1}{2}(x_u n_v + x_v n_u) = nx_{uv}$$

$$N = N(u, v) = -x_v n_v = nx_{vv}$$

$$n = \frac{x_u \wedge x_v}{\|x_u \wedge x_v\|} = \frac{1}{D}[x_u \wedge x_v]$$

When it is assumed that $\lambda = dv/du$, a normal curve $\kappa$ at an arbitrary point X (u, v) is expressed as Expression 3 in accordance with Expression 2.

$$\kappa(x, t) = \kappa(\lambda) = \frac{L + 2M\lambda + N\lambda^2}{E + 2F\lambda + G\lambda^2} \quad \text{[Expression 3]}$$

The principal curvatures are $\kappa_1$, $\kappa_2$ which are obtained by solving the following Expression 4 and the Gaussian curvature K is defined as $\kappa_1 \kappa_2$ and the average curvature H is defined as $(\kappa_1 + \kappa_2)/2$.

$$\kappa^2 - (\kappa_1 + \kappa_2)\kappa + \kappa_1\kappa_2 = 0 \quad \text{[Expression 4]}$$

$$\kappa_1 \kappa_2 = \frac{LN - M^2}{EG - F^2}$$

$$\kappa_1 + \kappa_2 = \frac{NE - 2MF + LG}{EG - F^2}$$

The projections and recesses of a free-form surface can be defined by using the above-mentioned principal curvatures as follows.

That is, from the principal curvature ($\kappa_1$, $\kappa_2$), (1) when $\kappa_1 \geq 0$ and $\kappa_2 \geq 0$ and $\kappa_1 \kappa_2 \neq 0$, (a) it is determined that the two curvatures increase. (2) When $\kappa_1 \leq 0$ and $\kappa_2 \leq 0$ and $\kappa_1 \kappa_2 \neq 0$, (b) it is determined that the two curvatures decrease. (3) When $\kappa_1 \cdot \kappa_2 < 0$, (c) it is determined that one of the curvatures increases and the other decreases. Consequently, for example, by labeling (a), (b), and (c) as mountain, valley, and peak, respectively, and displaying them by different symbols or colors in an image, the projections and recesses of the free-form surface can be simply and accurately grasped by the different symbols or colors.

According to the method of the invention, the characteristic of the principal curvature is used, the projections and recesses of the common parts of the measurement data are classified into mountain, valley, and peak as mentioned above, and larger absolute values of the product and/or sum among them are used as markers.

Figure 2:
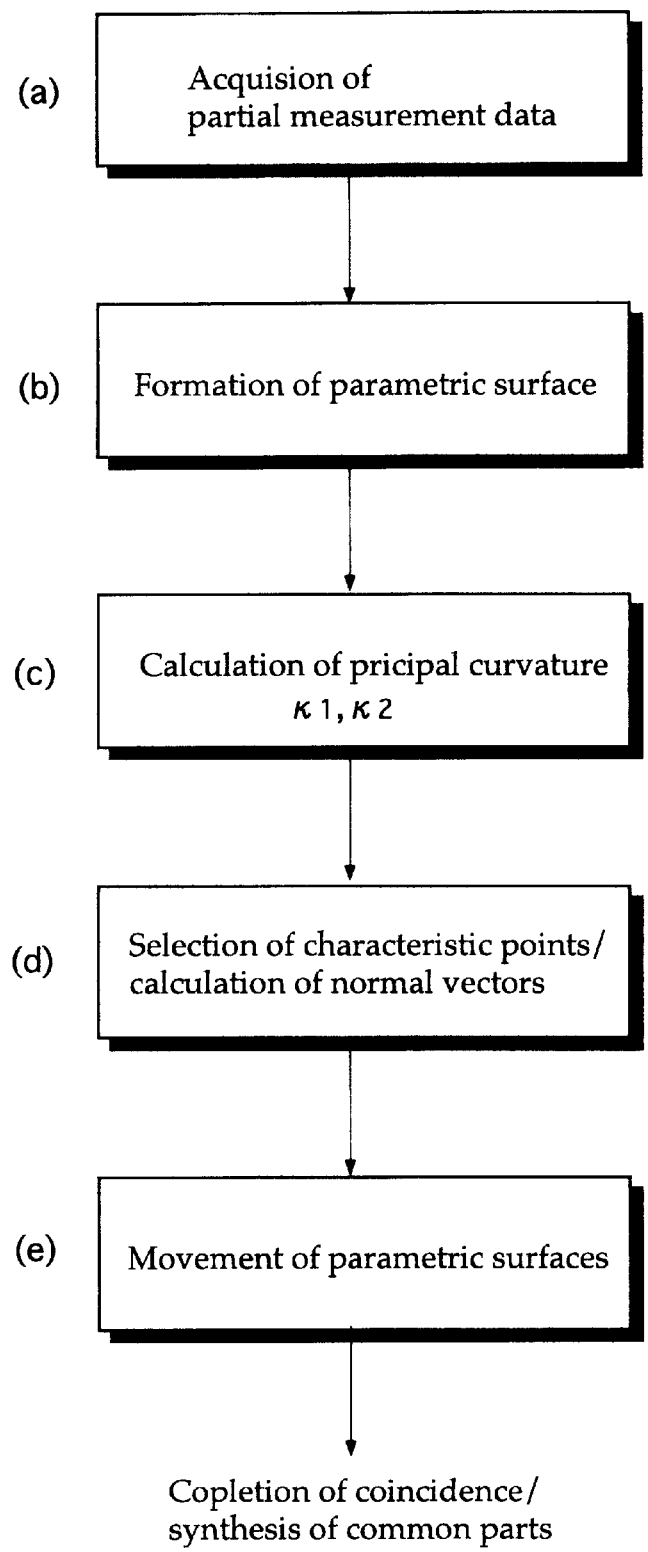
FIG. 2 is a flowchart showing the method of the invention.
Figure 3A:
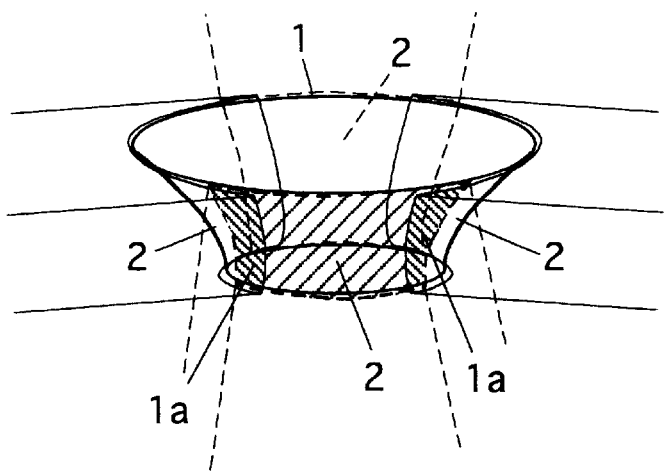
FIG. 3(A) is a conceptual diagram showing acquisition of partial measurement data according to the method of the invention.

FIG. 2 is a flowchart showing the method of the invention. FIGS. 3(A), (B), and (C) are conceptual diagrams. As shown in FIG. 2, the method of the invention comprises five steps (a) to (e). The method will be described hereinbelow with reference to FIG. 2 and FIGS. 3(A), (B), and (C).

As shown in FIG. 3(A), (a) the surface shape of an object 1 is measured from different positions and/or directions, thereby obtaining plural partial measurement data 2 (four in the diagram) including common parts 1a. In this case, the plural partial measurement data 2 is obtained so as to always include the common part 1a. The partial measurement data 2 is obtained at the same reduced scale. When the common part 1a is very narrow (for example, a peripheral part or the like), it is preferable to finely set a measurement pitch of the part.

The measurement is executed by using, for example, a three coordinate measuring machine (digitizer). In this case, the measuring machine is not limited. The machine of a contact type using a stylus, a noncontact type using a laser beam or the like, or other types can be also used. The object 1 can be optionally moved, turned, and the like at the time of measurement. In the invention, it is unnecessary to measure the movement/rotation amounts in this case.

The object 1 has to be a continuous free-form surface. For example, when the outer surface and the inner surface are separated, they are measured separately. In this case, it is necessary to input a relative distance (for instance, the thickness) between the outer and inner surfaces by another means.

Figure 3B:
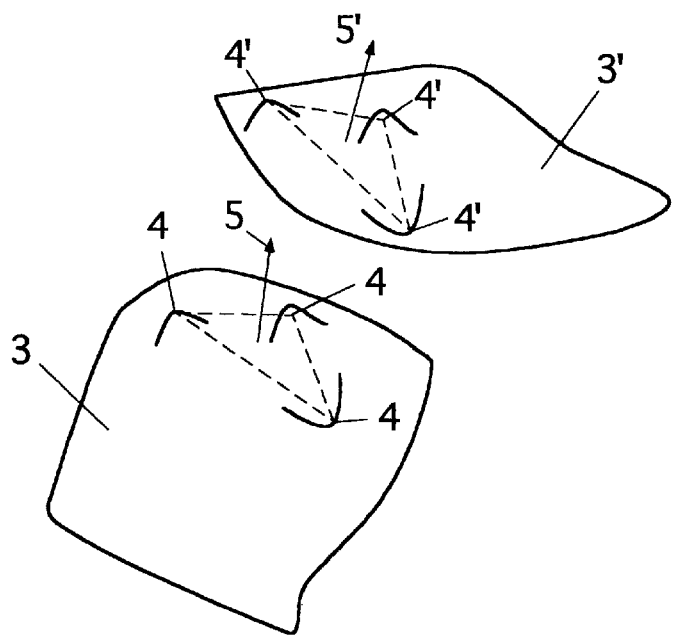
FIG. 3(B) is a conceptual diagram showing formation of parametric surfaces according to the method of the invention.

Subsequently, as shown in FIG. 3(B), (b) parametric surfaces 3, 3' expressing surface shapes of measurement ranges are calculated and formed from the plural partial measurement data 2. Although the calculation method is not limited as long as it is made by a computer so as to follow the definition of Expression 1, it is desired that the parametric surface is as accurate as measurement data.

Subsequently, (c) a plurality of sampling points are set at a predetermined pitch in the common part (part corresponding to 1a) on each of the parametric surfaces 3 and 3' and the Gaussian curvature K and the average curvature H are calculated from the principal curvatures ($\kappa_1$, $\kappa_2$) at the sampling points. The calculation can be executed from the above Expressions 2 to 4. Preferably, the set pitch of the sampling points is equal to or larger than the measurement pitch of the object 1.

Further, from the obtained principal curvatures ($\kappa_1$, $\kappa_2$), when (1) $\kappa_1 \geq 0$ and $\kappa_2 \geq 0$, and $\kappa_1 \kappa_2 \neq 0$, (a) it is determined that the two curvatures increase. When (2) $\kappa_1 \leq 0$ and $\kappa_2 \leq 0$ and $\kappa_1 \kappa_2 \neq 0$, (b) it is determined that the two curvatures decrease. When (3) $\kappa_1 \kappa_2 < 0$, (c) it is determined that one of the curvatures increases and the other decreases. It is preferable to display an image by labeling (a), (b), and (c) as mountain, valley, and peak, respectively, and displaying them by different symbols or colors (for example, brown, blue, and white).

Subsequently, (d) three or more characteristic points 4 and 4' are selected in accordance with the order from larger absolute values of the Gaussian curvature K or the average curvature H in the common parts and normal vectors 5 and 5' of planes each constructed by three points are calculated. Since the partial measurement data 2 is obtained at the same reduced scale, the characteristic points 4 and 4' are principally coincided with each other and the normal vectors 5 and 5' are also coincided with each other. Since the partial measurement data 2 is separately obtained, however, a slight difference may occur. The difference is at a level equivalent to that of the measurement error, so that the data is processed on assumption that the difference is substantially the same as the measurement error.

Figure 3C:
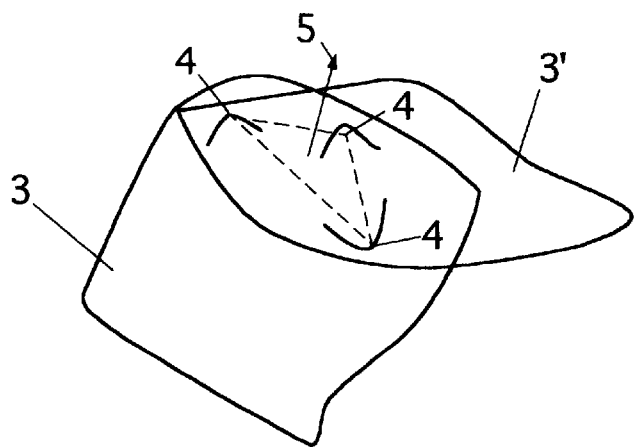
FIG. 3(C) is a conceptual diagram showing coinciding operation of common parts of the parametric surfaces according to the method of the invention.

Subsequently, as shown in FIG. 3(C), (e) the common parts are coincided with each other by relatively moving the parametric surfaces 3 and 3' so as to coincide the three characteristic points 4, 4' with each other and the directions of the normal vectors 5, 5' with each other. The calculation and the movement of the parametric surfaces (the three degrees of freedom in translation and the three degrees of freedom in rotation) can be easily performed by a known method with respect to the parametric surfaces expressed by parameters. By the movement, the synthesis (patching) of the two partial measurement data 2 whose common parts are coincided is completed. In case of three or more partial measurement data 2, by repeatedly executing the above-mentioned processes (especially, (e)), all of the partial measurement data 2 can be synthesized.

As mentioned above, according to the invention, three or more characteristic points 4 are selected in accordance with the order of larger absolute values of the Gaussian curvature or the average curvature H in the common parts and are used as markers, thereby coinciding the common parts of the parametric surfaces 3 obtained from the plurality of partial measurement data 2 with each other and enabling the measurement data to be synthesized (patched).

Preferably, in the step of (d), four or more characteristic points 4 are selected in accordance with the order from larger absolute values of the Gaussian curvature K or the average curvature H and the normal vectors 5 of a plurality of planes each constructed by arbitrary three points are calculated and (e) the common parts are made coincided with each other by relatively moving the parametric surfaces 3 so as to minimize the difference in the plurality of combinations of the three characteristic points 4 and the directions of the normal vectors 5. As the optimization, a known method such as the least-squares method or the like can be used.

As mentioned above, by executing the optimization by using not only the three points in accordance with the order from larger absolute values of the Gaussian curvature K or the average curvature H but also the plurality of characteristic points 4, the accuracy of the synthesis (patching) can be further increased.

Although the characteristic points 4 are shown by mountains or valleys in FIGS. 3(A), (B), and (C), they can be also shown by peaks. It is preferable to confirm that corresponding characteristic points coincide with each other by using not only the magnitude of the absolute value of the Gaussian curvature K or the average curvature H but also the symbols or colors (labels) of mountain, valley, and peak.

It is also preferable to label the projections and recesses of the surface of the common part as (a) mountain, (b) valley, and (c) peak, to display them by different symbols or colors in an image, and after that, by also using the above-mentioned method, to move the parametric surfaces so that the whole or most parts of the labels coincide with each other. By using the method at the same time, the coincidence of the projections and recesses of the whole common parts can be confirmed on the CRT, the occurrence of an error due to an influence of noises and the like can be avoided, and the reliability can be improved.

As mentioned above, by using the method of the invention, like the case of measuring the surface shape data of the mock-up of a vehicle, even in case of measuring the surface shape of a wide object which cannot be measured by one operation or a complicated three-dimensional object which can be measured only from different directions, the synthesized data having the accuracy equivalent to that of the measurement data can be formed from the partial measurement data obtained from a free-form surface which is not limited to a simple shape without mechanically rotating or translating the object, without using markers, and without requiring the skill.

By combining the method of the invention with a measuring machine or the like, the whole outward appearance can be accurately displayed from partial measurement data obtained by dividedly measuring the parts and the quality of the appearance of the body of a vehicle, the face of a person, or the like can be easily and accurately discriminated. Also in numerical simulation of the body shape of an aircraft or the like or a functional component such as a turbine blade, a junction part can be smoothed and analytic accuracy of fluid flow or the like can be increased.

That is, the method of the invention can be widely industrially used with a three coordinate measuring machine, a CAD system, a CAM system, or a simulation system in the wide-ranged molding processing field or the shape measuring and evaluating field.

Although the invention has been described by some preferred embodiments, it will be understood that the range of the right included in the invention is not limited by the embodiments. On the contrary, the range of the right of the invention includes all of improvements, modifications, and equivalents included in the scope of the appended claims. In case of an object having no characteristic points, the conventional marker method or the like can be also used in accordance with necessity.

What is claimed is:

1. A method of synthesizing measurement data of a free-form surface, comprising the steps of:

(a) measuring a surface shape of an object from different positions and/or different directions and obtaining plural partial measurement data including a common part;

(b) forming a parametric surface showing the surface shape of each measurement range from said plural partial measurement data;

(c) setting a plurality of sampling points at a predetermined pitch in said common part on each of said parametric surfaces and calculating the Gaussian curvature $K=\kappa_1 \times \kappa_2$ and an average curvature $H=(\kappa_1+\kappa_2)/2$ from the principal curvatures $(\kappa_1, \kappa_2)$ in said sampling points, (d) selecting three or more characteristic points in accordance with the order from larger absolute values of the Gaussian curvature K and/or the average curvature H in the common part and calculating a normal vector of a plane constructed by three points among the characteristic points; and (e) making the common parts coincide with each other by moving the parametric surfaces so as to coincide the three characteristic points with each other and the directions of the normal vectors with each other.

2. A method according to claim 1, wherein four or more characteristic points are selected in accordance with the order from larger absolute values of the Gaussian curvature K and/or the average curvature H and normal vectors of a plurality of planes each constructed by arbitrary three points are calculated in the step (d), and further comprising the step (e) of making the common parts coincide with each other by moving the parametric surfaces so as to minimize the difference in a plurality of combinations of said three characteristic points and said directions of the normal vectors.

3. A method according to claim 1, wherein from said principal curvatures $(\kappa_1, \kappa_2)$, (1) when $\kappa_1 \geq 0$ and $\kappa_2 \geq 0$, and $\kappa_1 \kappa_2 \neq 0$, (a) it is determined that the two curvatures increase, (2) when $\kappa_1 \leq 0$ and $\kappa_2 \leq 0$ and $\kappa_1 \kappa_2 \neq 0$, (b) it is determined that the two curvatures decrease, and (3) when $\kappa_1 \cdot \kappa_2 < 0$, (c) it is determined that one of the curvatures increases and the other decreases, and (a), (b), and (c) are labeled as mountain, valley, and peak, respectively, and are displayed by different symbols or colors in an image, and the parametric surfaces are moved so that the labels are coincided with each other.

4. A method according to claim 2, wherein from said principal curvatures $(\kappa_1, \kappa_2)$, (1) when $\kappa_1 \geq 0$ and $\kappa_2 \geq 0$, and $\kappa_1 \kappa_2 \neq 0$, (a) it is determined that the two curvatures increase, (2) when $\kappa_1 \leq 0$ and $\kappa_2 \leq 0$, and $\kappa_1 \kappa_2 \neq 0$, (b) it is determined that the two curvatures decrease, and (3) when $\kappa_1 \cdot \kappa_2 < 0$, (c) it is determined that one of the curvatures increases and the other decreases, and (a), (b), and (c) are labeled as mountain, valley, and peak, respectively, and are displayed by different symbols or colors in an image, and the parametric surfaces are moved so that the labels are coincided with each other.

* * * * *